(12) United States Patent
Bragstad et al.

(10) Patent No.: US 9,544,399 B2
(45) Date of Patent: Jan. 10, 2017

(54) VISUALLY DEPICTING CLOUD RESOURCE UTILIZATION DURING EXECUTION OF AN APPLICATION

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/951,823

(22) Filed: Jul. 26, 2013

(65) Prior Publication Data
US 2015/0033134 A1    Jan. 29, 2015

(51) Int. Cl.
*G06F 3/048* (2013.01)
*H04L 29/08* (2006.01)
(Continued)

(52) U.S. Cl.
CPC ........... *H04L 67/36* (2013.01); *G06F 3/04845* (2013.01); *G06F 3/04847* (2013.01);
(Continued)

(58) Field of Classification Search
CPC ........ H04L 43/04; H04L 43/045; H04L 43/08; H04L 43/0887–43/0894; H04L 43/16; H04L 41/0681; H04L 41/0896; G06F 9/50; G06F 9/5061–9/5083; G06F 3/048–3/04886
See application file for complete search history.

(56) References Cited

U.S. PATENT DOCUMENTS 6,590,587 B1 * 7/2003 Wichelman et al. ......... 715/736
6,704,012 B1 * 3/2004 Lefave ................ G06F 11/323
345/440
(Continued)

OTHER PUBLICATIONS

Hewlett-Packard Development Company. HP Insight Cluster Management Utility V7.0 User Guide (Mar. 2012). Retrieved Nov. 11, 2015 from http://h20628.www2.hp.com/km-ext/kmcsdirect/emr_na-c03230822-1.pdf.*

(Continued)

*Primary Examiner* — Andrea Long
*Assistant Examiner* — Linda Huynh
(74) *Attorney, Agent, or Firm* — Brandon C. Kennedy; Feb Cabrasawan; Kennedy Lenart Spraggins LLP (57) ABSTRACT

Visually depicting cloud resource utilization during execution of an application, the application using multiple cloud resources deployed on multiple cloud hosts, including: displaying, by a resource monitoring module in a graphical user interface, a visual depiction of resource utilization of the multiple cloud resources during execution of the application; receiving, from a user through the graphical user interface displaying the visual depiction of resource utilization of the multiple cloud resources, a resource utilization threshold for each of the multiple cloud resources; determining, by the resource monitoring module, whether one or more of the resource utilization thresholds have been reached; and responsive to determining that one or more of the resource utilization thresholds have been reached, executing a predetermined action.

16 Claims, 6 Drawing Sheets

(51) Int. Cl.
*H04L 12/26* (2006.01)
*H04L 12/24* (2006.01)
*G06F 3/0484* (2013.01)
*G06F 11/34* (2006.01)

(52) U.S. Cl.
CPC .......... *H04L 12/2692* (2013.01); *H04L 41/22* (2013.01); *G06F 11/3466* (2013.01)

(56) References Cited

U.S. PATENT DOCUMENTS

| | | | |
|---|---|---|---|
| 8,316,305 B2 | 11/2012 | Jaisinghani | |
| 8,336,029 B1* | 12/2012 | McFadden | G06F 9/45516 717/100 |
| 8,819,106 B1* | 8/2014 | Sirota | G06F 9/485 709/201 |
| 2003/0216890 A1* | 11/2003 | Gross | G06F 11/3414 702/186 |
| 2005/0086455 A1* | 4/2005 | DeWitt, Jr. | G06F 9/30181 712/227 |
| 2005/0093866 A1* | 5/2005 | Ebert | G06Q 10/06 345/440 |
| 2005/0102534 A1* | 5/2005 | Wong | G06F 21/577 726/4 |
| 2007/0168968 A1* | 7/2007 | Bates | G06F 11/3636 717/124 |
| 2009/0182866 A1* | 7/2009 | Watanabe et al. | 709/224 |
| 2010/0110932 A1* | 5/2010 | Doran et al. | 370/254 |
| 2010/0242026 A1* | 9/2010 | Bates | G06F 11/362 717/128 |
| 2011/0029882 A1 | 2/2011 | Jaisinghani | |
| 2011/0258613 A1* | 10/2011 | Bhogal | G06F 11/3636 717/129 |
| 2011/0295999 A1* | 12/2011 | Ferris et al. | 709/224 |
| 2012/0117542 A1 | 5/2012 | Bates | |
| 2012/0297238 A1* | 11/2012 | Watson | G06F 11/3442 714/4.11 |
| 2013/0124714 A1* | 5/2013 | Bednar | G06F 9/45558 709/224 |
| 2014/0013309 A1* | 1/2014 | Gounares | G06F 11/3664 717/125 |
| 2014/0026122 A1* | 1/2014 | Markande | G06F 11/3664 717/124 |
| 2014/0201642 A1* | 7/2014 | Vicat-Blanc | H04L 41/22 715/736 |
| 2014/0372414 A1* | 12/2014 | Malinowski | G06F 17/30554 707/722 |
| 2015/0193328 A1* | 7/2015 | Deakin | G06F 11/362 714/38.1 |

OTHER PUBLICATIONS

Hassan-Montero, et al., "Improving Tag-Clouds As Visual Information Retrieval Interfaces", In International Conference on Multidisciplinary Information Sciences and Technologies (InSciT2006), Oct. 2006, 6 pages, Merida, Spain.

* cited by examiner

VISUALLY DEPICTING CLOUD RESOURCE UTILIZATION DURING EXECUTION OF AN APPLICATION

BACKGROUND OF THE INVENTION

Field of the Invention

The field of the invention is data processing, or, more specifically, methods, apparatus, and products for visually depicting cloud resource utilization during execution of an application.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer software has become more sophisticated, debuggers that are used to analyze software defects or to optimize performance have also evolved. Debuggers allow a user to follow the flow of program execution and inspect the state of a program at any point by controlling execution of the program being debugged. Debuggers may control program execution through a variety of operations including a debugger step function. A debugger step function is a function that instructs a computer processor to execute a single statement of computer program code and then to return processing control back to the debugger. A debugger, and many other software applications, frequently can consume varying amounts of computing resources at different periods during the execution cycle.

SUMMARY OF THE INVENTION

Methods, apparatuses, and products for visually depicting cloud resource utilization during execution of an application, the application using multiple cloud resources deployed on multiple cloud hosts, including: displaying, by a resource monitoring module in a graphical user interface, a visual depiction of resource utilization of the multiple cloud resources during execution of the application; receiving, from a user through the graphical user interface displaying the visual depiction of resource utilization of the multiple cloud resources, a resource utilization threshold for each of the multiple cloud resources; determining, by the resource monitoring module, whether one or more of the resource utilization thresholds have been reached; and responsive to determining that one or more of the resource utilization thresholds have been reached, executing a predetermined action.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
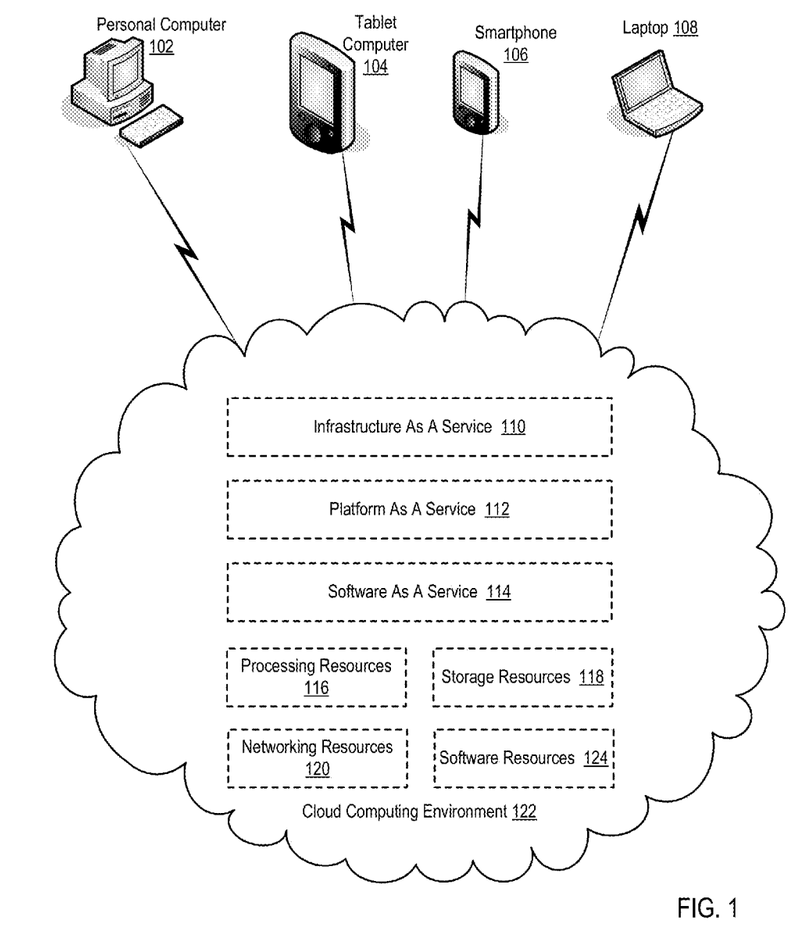
FIG. 1 sets forth a network diagram of a cloud computing environment useful in visually depicting cloud resource utilization during execution of an application according to embodiments of the present invention.

Example methods, apparatus, and products for visually depicting cloud resource utilization during execution of an application in accordance with the present invention are described with reference to the accompanying drawings, beginning with FIG. 1. FIG. 1 sets forth a network diagram of a cloud computing environment (122) useful in visually depicting cloud resource utilization during execution of an application according to embodiments of the present invention. Cloud computing, as the term is used here, represents a model for enabling ubiquitous, convenient, on-demand access to a shared pool of configurable computing resources. Such computing resources can includes data communications networks, computing machinery such as servers, computer storage, software applications, and other resources that that may be rapidly provisioned and released with minimal management effort or interaction from the cloud computing service provider. In the example of FIG. 1, the cloud computing environment (122) can include such a collection of computing resources.

The cloud computing environment (122) of FIG. 1 includes processing resources (116), storage resources (118), networking resources (120), and software resources (124). The processing resources (116) depicted in FIG. 1 represent computer hardware for executing computer program instructions. Such computer hardware can include computer processors and other forms of digital circuit circuitry that may be included in servers, compute nodes, standalone computers, and so on. The storage resources (118) of FIG. 1 represent computer hardware for storing data. Such hardware can includes disk arrays, hard drives, random access memory ('RAM'), and other forms of computer memory that that may be included in servers, compute nodes, standalone computers, and so on. The networking resources (120) depicted in FIG. 1 represent computer hardware for facilitating data communications between various resources inside the cloud computing environment (122) and for facilitating data communications with computing devices that connect to the cloud computing environment (122). Such computer hardware can include network switches, routers, communications adapters that may be included in servers, compute nodes, standalone computers, and so on. The software resources (124) depicted in FIG. 1 represent computer program instructions that may be executed on the processing resources (116), stored on the storage resources (118), and may communicate over the networking resources (120). Such computer program instructions may include operating systems, special purpose software applications, firmware, and so on. Although the processing resources (116), storage resources (118), networking resources (120), and software resources (124) are depicted as being distinct, readers will appreciate that many of these resources may reside within a single computer such as a server. The separation of such resources is only included to identify the various functionalities provided by each resource.

The cloud computing environment (122) of FIG. 1 may utilize the various resources (116, 118, 120, 124) that reside within the cloud computing environment (122) to provide services to users of the cloud computing environment (122). The cloud computing environment (122) can offer such services according to several fundamental models: infrastructure as a service ('IaaS') (110), platform as a service ('PaaS') (112), and software as a service ('SaaS') (114).

IaaS (110) is a service model in which the cloud computing environment (122) offers computers to users of the cloud computing environment (122). Such computers may be embodied as physical computers or virtual machines that are executing on underlying physical resources with the use of a hypervisor. In such an example, pools of hypervisors in the cloud computing environment (122) may offer a large number of virtual machines to users of the cloud computing environment (122). PaaS (112) is a service model in which the cloud computing environment (122) offers computing platforms to users of the cloud computing environment (122). Such computing platforms can include operating systems, databases, web servers, programming language execution environments, and so on. Saas (114) is a service model in which the cloud computing environment (122) offers access to software applications to users of the cloud computing environment (122).

Many types of devices may communicate with the cloud computing environment (122) of FIG. 1 and may take advantage of the services provided by the cloud computing environment (122). In the example of FIG. 1, a personal computer (102), tablet computer (104), smartphone (106), and laptop computer (108) are depicted as being coupled for data communications with the cloud computing environment (122), although readers will appreciate that many other types of computing devices may also be coupled for data communications with the cloud computing environment (122). Such devices may be coupled for data communications with the cloud computing environment (122), for example, over a data communications network such as the Internet, telecommunications networks, wireless networks, and so on.

The arrangement of computing resources and other devices making up the example cloud computing environment (122) illustrated in FIG. 1 are for explanation, not for limitation. Cloud computing environments useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1. Readers will further appreciate that many of the devices illustrated in FIG. 1 may be embodied as virtualized devices. For example, the cloud computing environment (122) may include virtual machines coupled for data communications by virtual routers and other virtualized networking components.

Readers will further appreciate that the example cloud computing environment (122) illustrated in FIG. 1 is simply one example of a cloud computing environment. Cloud computing environments according to embodiments of the present application may take many other forms, and may actually be implemented across multiple clouds. For example, one cloud could have a private Iaas on a single server provider while two different private clouds run AaaS using different implementations of hardware.

Figure 2:
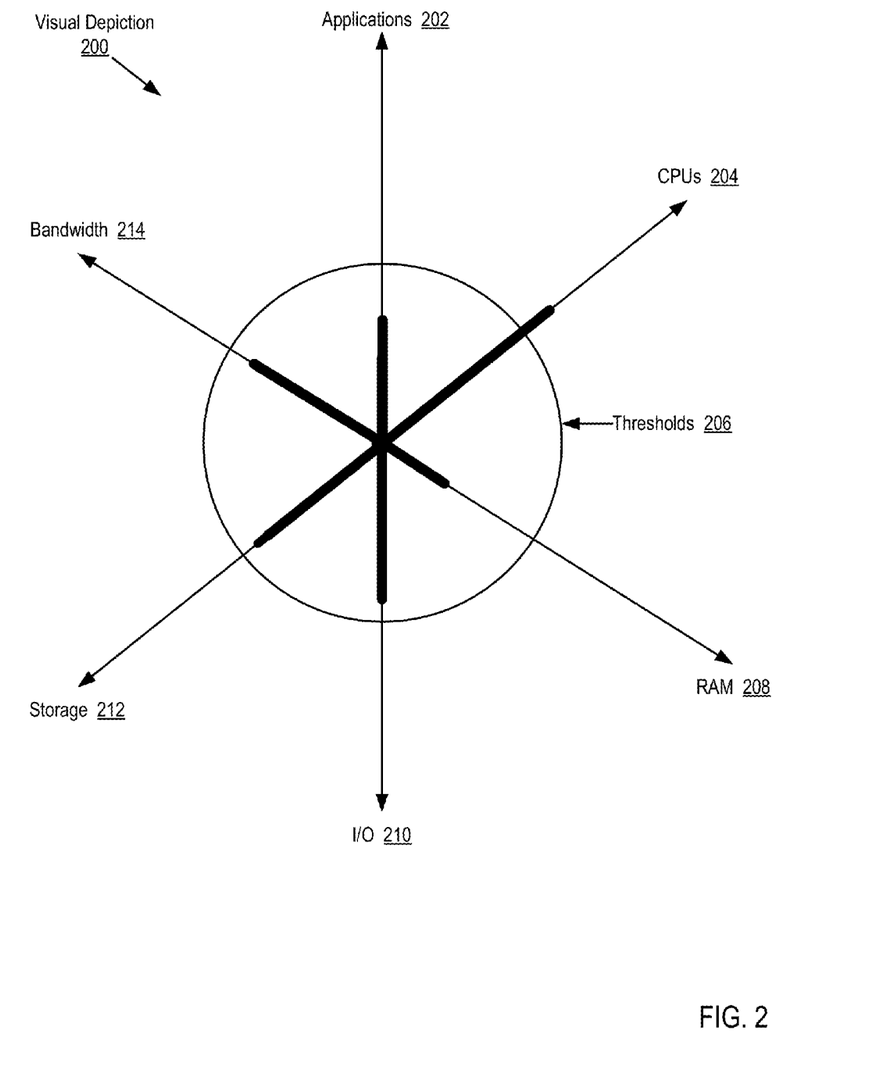
FIG. 2 sets forth an example of a visual depiction of cloud resource utilization during execution of an application according to embodiments of the present invention.

For further explanation, FIG. 2 sets forth an example of a visual depiction (200) of cloud resource utilization during execution of an application according to embodiments of the present invention. The visual depiction (200) of FIG. 2 may be embodied as a graphical representation of the extent to which various resources in a cloud computing environment are being utilized during execution of an application. Such a visual depiction (200) of cloud resource utilization may be rendered, for example, through the use of a graphical user interface displayed on a display device that is accessible to a user, as explained in more detail below.

The visual depiction (200) of FIG. 2 includes six axes, labeled applications (202), CPUs (204), RAM (208), I/O (210), storage (212), and bandwidth (214). In the example of FIG. 2, the applications (202) axis may be configured to represent the number of supporting applications being executed in the SaaS model described above during execution of an application. The CPUs (204) axis may be configured to represent the number of physical central processing units ('CPUs') being utilized during execution of an application and the RAM (208) axis may be configured to represent the amount of random access memory ('RAM') being utilized during execution of an application. The I/O (210) axis may be configured to represent the number of input/output ('I/O') operations being performed per unit of time during execution of an application, the storage (212) axis may be configured to represent the amount of disk storage being utilized during execution of an application, and the bandwidth (214) axis may be configured to represent the amount of network bandwidth utilized during execution of an application. In such an example, the visual depiction of cloud resource utilization includes a darkened line that is superimposed over each axis, indicating the actual amount of usage of the corresponding cloud resource at a given point in time. In such an example, the depicted actual amount of usage of the corresponding cloud resource at a given point in time may correspond to the sum of usage for a particular set of resource consumers, such as a predetermined group of virtual machines.

The visual depiction (200) of FIG. 2 also includes a graphical representation of the threshold (206) associated with each resource. The thresholds (206) associated with each resource represents the extent to which a particular resource may be utilized without requiring additional action. In the example of FIG. 2, the visual depiction (200) of cloud resource utilization indicates that the cloud resource corresponding to the CPUs (204) axis is being utilized to a level that exceeds the allowable threshold. In such an example, corrective action may be taken to increase the number of CPUs that are available to the application, consolidate the execution of the application to a smaller number of CPUs, pause execution of the application, and so on in an effort to bring the utilization of the associated resource to a value that is within the threshold associated with the cloud resource corresponding to the CPUs (204) axis. Readers will appreciate that the visual depiction (200) of FIG. 2 is for explanation and not for limitation. Visual depictions of cloud resource utilization during execution of an application may take many other forms and may track the usage of many other cloud resources.

Figure 3:
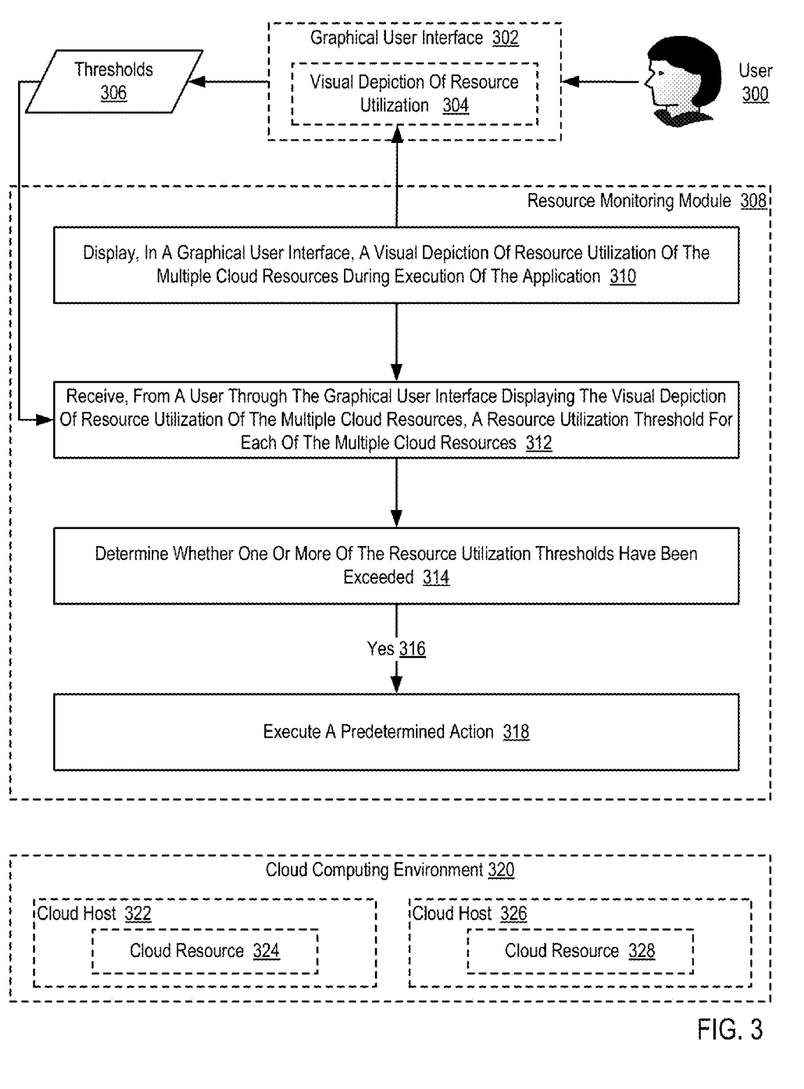
FIG. 3 sets forth a flow chart illustrating an example method for visually depicting cloud resource utilization during execution of an application that uses multiple cloud resources deployed on multiple cloud hosts in a cloud computing environment according to embodiments of the present invention.

For further explanation, FIG. 3 sets forth a flow chart illustrating an example method for visually depicting cloud resource utilization during execution of an application that uses multiple cloud resources (324, 328) deployed on multiple cloud hosts (322, 326) in a cloud computing environment (320) according to embodiments of the present invention. In the example method of FIG. 3, the cloud computing environment (320) may be similar to the cloud computing environment (122) depicted in FIG. 1. The cloud resources (324, 328) of such a cloud computing environment (320) can therefore include the various services and the various resources depicted in FIG. 1. Likewise, the cloud hosts (322, 326) of such a cloud computing environment (320) can include the physical resources depicted and described with respect to FIG. 1.

The example method of FIG. 3 includes displaying (310), by a resource monitoring module (308) in a graphical user interface (302), a visual depiction of resource utilization (304) of the multiple cloud resources (324, 328) during execution of the application. The multiple cloud resources (324, 328) may include physical resources such as computer hardware, virtual resources that are virtualized on physical computer hardware, other resources such as services supported by the cloud, or any combination thereof. In the example method of FIG. 3, the graphical user interface (302) may be displayed on a computing device accessible to the user (300) that is coupled for data communications with the cloud computing environment (320) and the resource monitoring module (308). In the example method of FIG. 3, displaying (310) a visual depiction of resource utilization (304) of the multiple cloud resources (324, 328) during execution of the application may be carried out, for example, by the resource monitoring module (308) transmitting data describing the utilization of various cloud resources to the graphical user interface (302), by the resource monitoring module (308) transmitting a displayable image with data describing the utilization of various cloud resources to the graphical user interface (302), and so on.

The example method of FIG. 3 also includes receiving (312), from a user (300) through the graphical user interface (302) displaying the visual depiction of resource utilization (304) of the multiple cloud resources, a resource utilization threshold (306) for each of the multiple cloud resources (324, 328). The resource utilization threshold (306) may specify a permissible extent to which a single cloud resource may be utilized, a permissible extent to which a single cloud resource may be utilized by a predetermined subset of resource consumers, and so on. In the example method of FIG. 3, the visual depiction of resource utilization (304) may include a graphical element that represents a resource utilization threshold (306) for each of the multiple cloud resources (324, 328), as illustrated in FIG. 2. In such an example, receiving (312) a resource utilization threshold (306) for each of the multiple cloud resources (324, 328) may be carried out by the user (300) manipulating graphical element that represents a resource utilization threshold (306) for each of the multiple cloud resources (324, 328), such as the user (300) utilizing a mouse to expand or contract the graphical element that represents a resource utilization threshold (306) for each of the multiple cloud resources (324, 328). Alternatively, receiving (312) a resource utilization threshold (306) for each of the multiple cloud resources (324, 328) may be carried out by the user (300) selecting a particular cloud resource (324) through the graphical user interface (302) and typing in a value to be used as the resource utilization threshold (306) for the selected cloud resource (324).

The example method of FIG. 3 also includes determining (314), by the resource monitoring module (308), whether one or more of the resource utilization thresholds (306) have been reached. In the example method of FIG. 3, the resource monitoring module (308) may be configured to monitor multiple cloud resources (324, 328). The resource monitoring module (308) may monitor multiple cloud resources (324, 328), for example, by polling each cloud host (322, 326) for resource utilization information. In such an example, the resource monitoring module (308) may be configured to determine (314) whether one or more of the resource utilization thresholds (306) have been reached by comparing the resource utilization thresholds (306) to the resource utilization information received from each cloud host (322, 326).

The example method of FIG. 3 also includes executing (318) a predetermined action. In the example method of FIG. 3, executing (318) a predetermined action is carried out in response to affirmatively (316) determining that one or more of the resource utilization thresholds (306) have been reached. In the example method of FIG. 3, the predetermined action may be executed (318) in order to attempt to bring the utilization of a particular cloud resource (324, 328) to a level that is within the resource utilization threshold (306) for the particular cloud resource (324, 328). Such predetermined actions can include pausing the execution of the application, allocating additional cloud resources to the application, altering the resource utilization threshold (306) for the particular cloud resource (324, 328), and so on.

Figure 4:
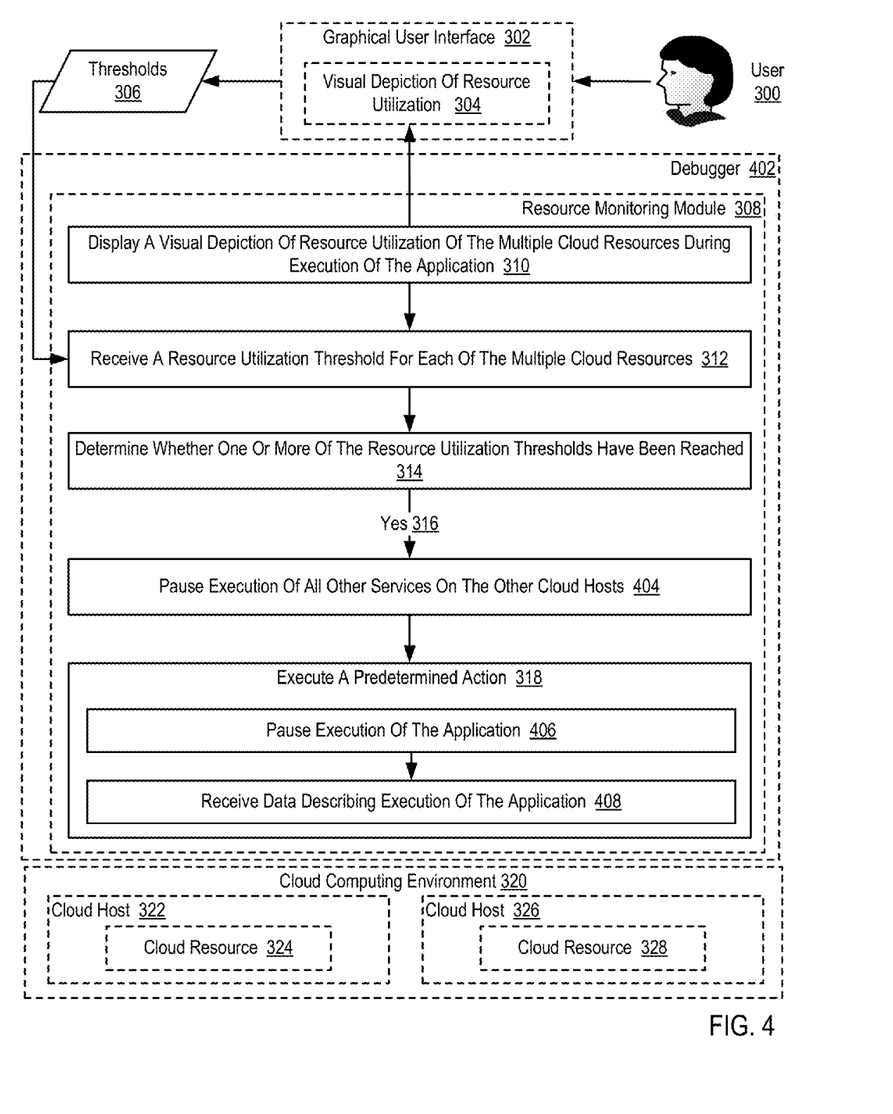
FIG. 4 sets forth a flow chart illustrating a further example method for visually depicting cloud resource utilization during execution of an application that uses multiple cloud resources deployed on multiple cloud hosts according to embodiments of the present invention.

For further explanation, FIG. 4 sets forth a flow chart illustrating a further example method for visually depicting cloud resource utilization during execution of an application that uses multiple cloud resources (324, 328) deployed on multiple cloud hosts (322, 326) according to embodiments of the present invention. The example method of FIG. 4 is similar to the example method of FIG. 3 as it also includes displaying (310) a visual depiction of resource utilization (304) of the multiple cloud resources (324, 328) during execution of the application, receiving (312) a resource utilization threshold (306) for each of the multiple cloud resources (324, 328), determining (314) whether one or more of the resource utilization thresholds (306) have been reached, and executing (318) a predetermined action.

In the example method of FIG. 4, the resource monitoring module (308) is included in a debugger (402). In the example method of FIG. 4, the debugger (402) may be embodied as a computer program that is used to test and debug other programs, such as the executing application that uses multiple cloud resources (324, 328) deployed on multiple cloud hosts (322, 326). A user (300) of the debugger (402) may step through each line of code in the application that uses multiple cloud resources (324, 328) deployed on multiple cloud hosts (322, 326), such that visually depicting cloud resource utilization during execution of the application can include updating the visual depiction of resource utilization (304) upon the execution of each line of code in the application. In such a way, the user (300) of the debugger (402) can identify the portions of the application which cause utilization of the cloud resources (324, 328) to reach a resource utilization threshold (306).

In the example method of FIG. 4, executing (318) a predetermined action can include pausing (406) execution of the application. In the example method of FIG. 4, pausing (406) execution of the application may be carried out by temporarily pausing execution of the application until additional cloud resources can be allocated for use by the application, pausing execution of the application for a predetermined period of time, or completely terminating the execution of the application so that the application can be modified, additional cloud resources can be allocated, and so on.

In the example method of FIG. 4, executing (318) a predetermined action can also include receiving (408), by the resource monitoring module (308), data describing execution of the application. In the example method of FIG. 4, data describing execution of the application can include information identifying the amount of cloud resources being utilized by the application. Data describing execution of the application can also include information useful for debugging the application, such as values for different application variables that may allow a developer to properly debug the application and verify that the application is operating properly.

The example method of FIG. 4 also includes pausing (404) execution of all other applications on the cloud hosts (322, 326). In the example method of FIG. 4, pausing (404) execution of all other applications on the cloud hosts (322, 326) can occur upon reaching one or more of the resource utilization thresholds (306). By pausing (404) execution of all other applications on the cloud hosts (322, 326), additional cloud resources on the cloud hosts (322, 326) may be available to the application whose execution causes one or more of the resource utilization thresholds (306) to be reached.

Figure 5:
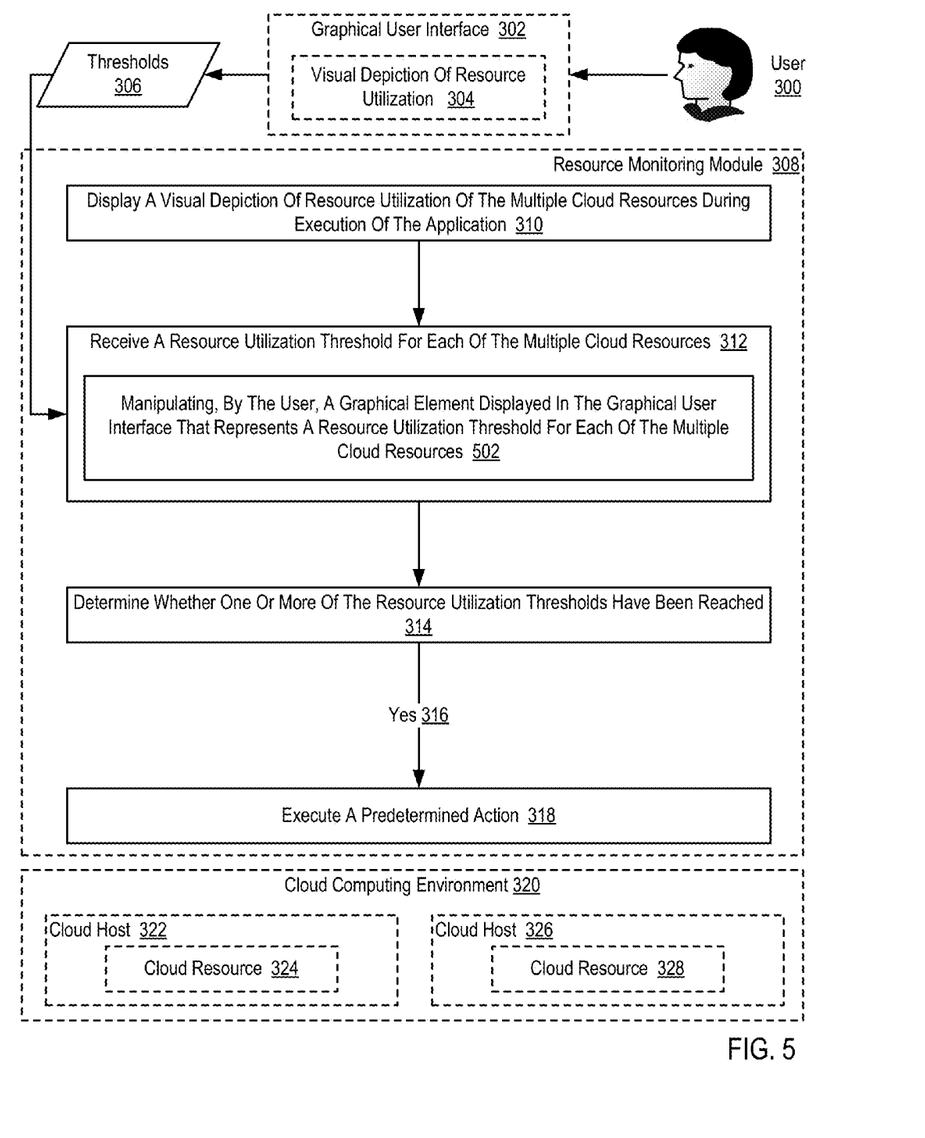
FIG. 5 sets forth a flow chart illustrating a further example method for visually depicting cloud resource utilization during execution of an application that uses multiple cloud resources deployed on multiple cloud hosts according to embodiments of the present invention.

For further explanation, FIG. 5 sets forth a flow chart illustrating a further example method for visually depicting cloud resource utilization during execution of an application that uses multiple cloud resources (324, 328) deployed on multiple cloud hosts (322, 326) according to embodiments of the present invention. The example method of FIG. 5 is similar to the example method of FIG. 3 as it also includes displaying (310) a visual depiction of resource utilization (304) of the multiple cloud resources (324, 328) during execution of the application, receiving (312) a resource utilization threshold (306) for each of the multiple cloud resources (324, 328), determining (314) whether one or more of the resource utilization thresholds (306) have been reached, and executing (318) a predetermined action.

In the example method of FIG. 5, receiving (312) a resource utilization threshold (306) for each of the multiple cloud resources (324, 328) can include manipulating (502), by the user (300), a graphical element displayed in the graphical user interface (302) that represents a resource utilization threshold (306) for each of the multiple cloud resources (324, 328). In the example method of FIG. 5, such a graphical element may be embodied, for example, as a sphere superimposed over a graph that includes axes for each of the multiple cloud resources as depicted in FIG. 2. In such an example, manipulating (502) a graphical element displayed in the graphical user interface (302) that represents a resource utilization threshold (306) for each of the multiple cloud resources (324, 328) may be carried out, for example, by the user selecting the sphere and expanding or contracting the sphere through the use of a mouse. In such a way, the location of the sphere with respect to each of the axes may represent a resource utilization threshold (306) for the multiple cloud resources (324, 328) that correspond to each axis. Readers will appreciate that although the graphical element is described above as being a sphere superimposed over a graph that includes axes for each of the multiple cloud resources, other graphical elements are contemplated. For example, the graphical element is not required to be a fixed shape and may be embodied as an arbitrary polyhedron. Although values may be normalized aspect ratios may be fixed to ensure that the graphical element remains a pure shape, such features are not required.

Visually depicting cloud resource utilization during execution of an application that uses multiple cloud resources deployed on multiple cloud hosts in accordance with the present invention is generally implemented with computers, that is, with automated computing machinery. For further explanation, therefore, FIG. 6 sets forth a block diagram of automated computing machinery comprising an example computer (652) useful in visually depicting cloud resource utilization during execution of an application that uses multiple cloud resources deployed on multiple cloud hosts according to embodiments of the present invention. The computer (652) of FIG. 6 includes at least one computer processor (656) or 'CPU' as well as random access memory (668) ('RAM') which is connected through a high speed memory bus (666) and bus adapter (658) to processor (656) and to other components of the computer (652).

Stored in RAM (668) is a resource monitoring module (308), a module of computer program instructions for visually depicting cloud resource utilization during execution of an application. The cloud computing environment (320) of FIG. 6 may be similar to the cloud computing environment (122) depicted in FIG. 1. The cloud resources (324, 328) of such a cloud computing environment (320) can therefore include the various services and the various resources depicted in FIG. 1. Likewise, the cloud hosts (322, 326) of such a cloud computing environment (320) can include the physical resources depicted and described with respect to FIG. 1.

Figure 6:
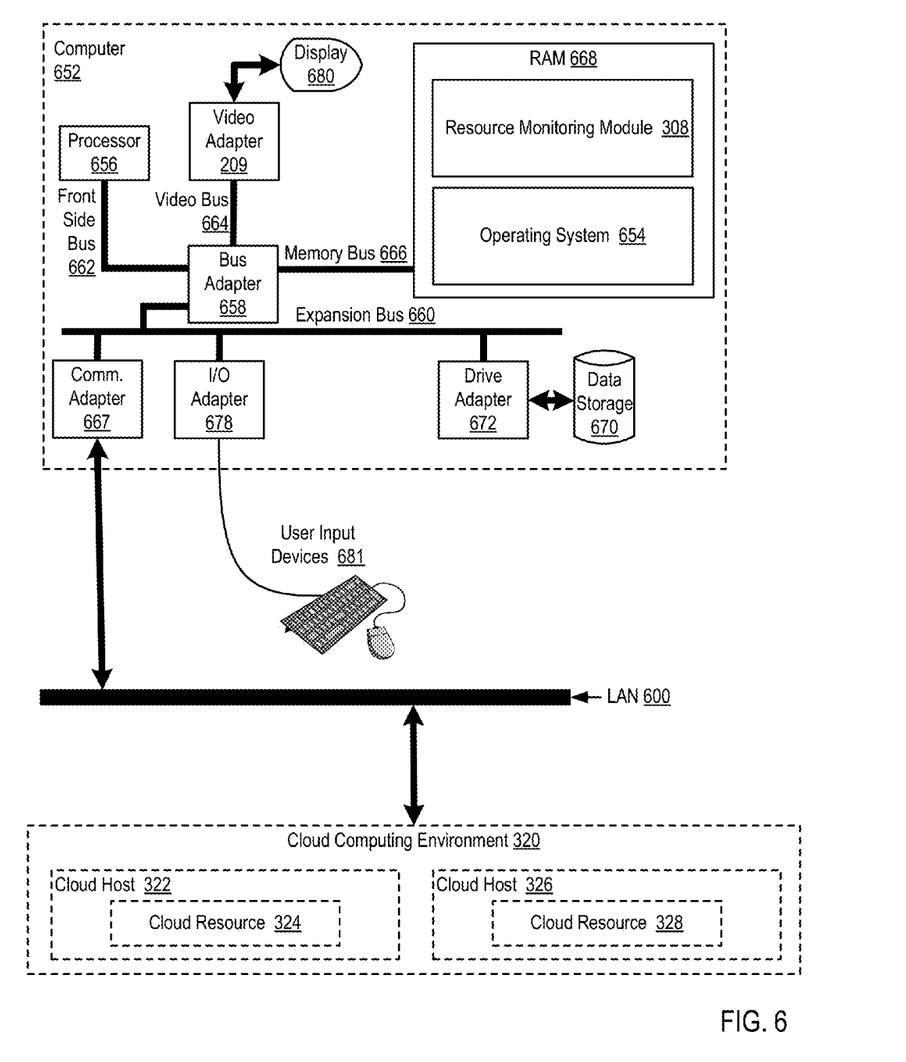
FIG. 6 sets forth a block diagram of automated computing machinery comprising an example computer useful in visually depicting cloud resource utilization during execution of an application that uses multiple cloud resources deployed on multiple cloud hosts according to embodiments of the present invention.

The resource monitoring module (308) of FIG. 6 may be configured to display, in a graphical user interface, a visual depiction of resource utilization of the multiple cloud resources (324, 328) during execution of the application. The resource monitoring module (308) of FIG. 6 may further be configured to receive, from a user through the graphical user interface displaying the visual depiction of resource utilization of the multiple cloud resources, a resource utilization threshold for each of the multiple cloud resources (324, 328). The resource monitoring module (308) of FIG. 6 may further be configured to determine whether one or more of the resource utilization thresholds have been reached. The resource monitoring module (308) of FIG. 6 may further be configured to execute a predetermined action in response to affirmatively determining that one or more of the resource utilization thresholds have been reached.

Also stored in RAM (668) is an operating system (654). Operating systems useful visually depicting cloud resource utilization during execution of an application that uses multiple cloud resources deployed on multiple cloud hosts according to embodiments of the present invention include UNIX™, Linux™, Microsoft XP™, AIX™, IBM's i5/OS™, and others as will occur to those of skill in the art. The operating system (654) and the resource monitoring module (308) in the example of FIG. 6 are shown in RAM (668), but many components of such software typically are stored in non-volatile memory also, such as, for example, on a disk drive (670).

The computer (652) of FIG. 6 includes disk drive adapter (672) coupled through expansion bus (660) and bus adapter (658) to processor (656) and other components of the computer (652). Disk drive adapter (672) connects non-volatile data storage to the computer (652) in the form of disk drive (670). Disk drive adapters useful in computers for visually depicting cloud resource utilization during execution of an application that uses multiple cloud resources deployed on multiple cloud hosts according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (652) of FIG. 6 includes one or more input/output ('I/O') adapters (678). I/O adapters implement user-oriented input/output through, for example, software drivers and computer hardware for controlling output to display devices such as computer display screens, as well as user input from user input devices (681) such as keyboards and mice. The example computer (652) of FIG. 6 includes a video adapter (209), which is an example of an I/O adapter specially designed for graphic output to a display device (680) such as a display screen or computer monitor. Video adapter (209) is connected to processor (656) through a high speed video bus (664), bus adapter (658), and the front side bus (662), which is also a high speed bus.

The example computer (652) of FIG. 6 includes a communications adapter (667) for data communications with other computers (682) and for data communications with a data communications network (600). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for visually depicting cloud resource utilization during execution of an application that uses multiple cloud resources deployed on multiple cloud hosts according to embodiments of the present invention include modems for wired dial-up communications, Ethernet (IEEE 802.3) adapters for wired data communications network communications, and 802.11 adapters for wireless data communications network communications.

Example embodiments of the present invention are described largely in the context of a fully functional computer system for visually depicting cloud resource utilization during execution of an application that uses multiple cloud resources deployed on multiple cloud hosts. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of visually depicting cloud resource utilization during execution of an application, the application using multiple cloud resources deployed on multiple cloud hosts, including:
    displaying, by a resource monitoring module in a graphical user interface, a visual depiction of resource utilization of the multiple cloud resources during execution of the application, the cloud resources comprising resources of a cloud computing environment implementing infrastructure as a service, platform as a service, and software as a service;
    receiving, from a user through the graphical user interface displaying the visual depiction of resource utilization of the multiple cloud resources, a resource utilization threshold for each of the multiple cloud resources includes manipulating, by the user, a graphical element displayed in the graphical user interface that represents the resource utilization threshold for each of the multiple cloud resources by expanding or contracting the graphical element that represents the resource utilization threshold for each of the multiple cloud resources, wherein the graphical element is three-dimensional;
    stepping through a line of code in the application;
    updating the visual depiction of resource utilization of the multiple cloud resources based on the stepped through line of code in the application;
    determining, by the resource monitoring module, whether one or more of the resource utilization thresholds have been reached; and
    responsive to determining that one or more of the resource utilization thresholds have been reached, executing a predetermined action.

2. The method of claim 1 wherein the resource monitoring module is included in a debugger.

3. The method of claim 2 wherein executing the predetermined action further comprises:
    pausing execution of the application; and
    receiving, by the resource monitoring module, data describing execution of the application.

4. The method of claim 1 further comprising, upon reaching one or more of the resource utilization thresholds, pausing execution of all other applications on the cloud hosts.

5. The method of claim 1 wherein the graphical element displayed in the graphical user interface that represents a resource utilization threshold for each of the multiple cloud resources includes a sphere superimposed over a graph that includes axes for each of the multiple cloud resources and wherein manipulating the graphical element displayed in the graphical user interface includes the user selecting the sphere and expanding or contracting the sphere.

6. The method of claim 1 wherein the resource utilization threshold indicates a permissible extent to which a single cloud resource may be utilized by a predetermined subset of resource consumers.

7. An apparatus for visually depicting cloud resource utilization during execution of an application, the application using multiple cloud resources deployed on multiple cloud hosts, the apparatus comprising a computer processor, a computer memory operatively coupled to the computer processor, the computer memory having disposed within it computer program instructions that, when executed by the computer processor, cause the apparatus to carry out the steps of:

displaying, by a resource monitoring module in a graphical user interface, a visual depiction of resource utilization of the multiple cloud resources during execution of the application, the cloud resources comprising resources of a cloud computing environment implementing infrastructure as a service, platform as a service, and software as a service;

receiving, from a user through the graphical user interface displaying the visual depiction of resource utilization of the multiple cloud resources, a resource utilization threshold for each of the multiple cloud resources includes manipulating, by the user, a graphical element displayed in the graphical user interface that represents the resource utilization threshold for each of the multiple cloud resources by expanding or contracting the graphical element that represents the resource utilization threshold for each of the multiple cloud resources, wherein the graphical element is three-dimensional;

stepping through a line of code in the application;

updating the visual depiction of resource utilization of the multiple cloud resources based on the stepped through line of code in the application;

determining, by the resource monitoring module, whether one or more of the resource utilization thresholds have been reached; and responsive to determining that one or more of the resource utilization thresholds have been reached, executing a predetermined action.

8. The apparatus of claim 7 wherein the resource monitoring module is included in a debugger.

9. The apparatus of claim 8 wherein executing the predetermined action further comprises:

pausing execution of the application; and receiving, by the resource monitoring module, data describing execution of the application.

10. The apparatus of claim 7 further comprising computer program instructions that, when executed by the computer processor, cause the apparatus to carry out the step of, upon reaching one or more of the resource utilization thresholds, pausing execution of all other applications on the cloud hosts.

11. The apparatus of claim 7 wherein the graphical element displayed in the graphical user interface that represents a resource utilization threshold for each of the multiple cloud resources includes a sphere superimposed over a graph that includes axes for each of the multiple cloud resources and wherein manipulating the graphical element displayed in the graphical user interface includes the user selecting the sphere and expanding or contracting the sphere.

12. A computer program product for visually depicting cloud resource utilization during execution of an application, the application using multiple cloud resources deployed on multiple cloud hosts, the computer program product disposed upon a non-volatile computer readable storage medium, the computer program product comprising computer program instructions that, when executed, cause a computer to carry out the steps of:

displaying, by a resource monitoring module in a graphical user interface, a visual depiction of resource utilization of the multiple cloud resources during execution of the application, the cloud resources comprising resources of a cloud computing environment implementing infrastructure as a service, platform as a service, and software as a service;

receiving, from a user through the graphical user interface displaying the visual depiction of resource utilization of the multiple cloud resources, a resource utilization threshold for each of the multiple cloud resources includes manipulating, by the user, a graphical element displayed in the graphical user interface that represents the resource utilization threshold for each of the multiple cloud resources by expanding or contracting the graphical element that represents the resource utilization threshold for each of the multiple cloud resources, wherein the graphical element is three-dimensional;

stepping through a line of code in the application;

updating the visual depiction of resource utilization of the multiple cloud resources based on the stepped through line of code in the application;

determining, by the resource monitoring module, whether one or more of the resource utilization thresholds have been reached; and responsive to determining that one or more of the resource utilization thresholds have been reached, executing a predetermined action.

13. The computer program product of claim 12 wherein the resource monitoring module is included in a debugger.

14. The computer program product of claim 13 wherein executing the predetermined action further comprises:

pausing execution of the application; and receiving, by the resource monitoring module, data describing execution of the application.

15. The computer program product of claim 12 further comprising computer program instructions that, when executed, cause the computer to carry out the step of, upon reaching one or more of the resource utilization thresholds, pausing execution of all other applications on the cloud hosts.

16. The computer program product of claim 12 wherein the graphical element displayed in the graphical user interface that represents a resource utilization threshold for each of the multiple cloud resources includes a sphere superimposed over a graph that includes axes for each of the multiple cloud resources and wherein manipulating the graphical element displayed in the graphical user interface includes the user selecting the sphere and expanding or contracting the sphere.

* * * * *